United States Patent
Fortier et al.

(10) Patent No.: US 6,209,898 B1
(45) Date of Patent: Apr. 3, 2001

(54) TRACTION WEIGHTS FOR LIGHT TRUCKS AND UTILITY VEHICLES

(76) Inventors: Timothy E. Fortier, 5338 Jaime La., Flushing, MI (US) 48433; Frank R. Keipert, Jr., 412 S. Mountain St., Bay City, MI (US) 48706

( * ) Notice: Subject to any disclaimer, the term of this patent is extended or adjusted under 35 U.S.C. 154(b) by 0 days.

(21) Appl. No.: 09/287,864

(22) Filed: Apr. 7, 1999

Related U.S. Application Data

(60) Provisional application No. 60/081,104, filed on Apr. 8, 1998.

(51) Int. Cl.$^7$ ............................................. B62C 7/00
(52) U.S. Cl. .................... 280/187; 280/757; 280/759; 414/673; 414/719
(58) Field of Search ................... 280/759, 757, 280/187, 416.1, 186; 414/673, 719; 212/195

(56) References Cited

U.S. PATENT DOCUMENTS

| | | | |
|---|---|---|---|
| 3,032,352 | * 5/1962 | Barrett | 280/150 |
| 3,490,787 | * 1/1970 | Latterman | 280/150 |
| 3,517,941 | * 6/1970 | Lazzeroni | 280/150 |
| 3,853,231 | 12/1974 | Luttrell . | |
| 4,482,169 | 11/1984 | Yim . | |
| 4,688,823 | 8/1987 | Hanses . | |
| 5,322,313 | * 6/1994 | Schroeder | 280/416.1 |
| 5,462,309 | * 10/1995 | Jeffers et al. | 280/759 |
| 5,690,359 | 11/1997 | Teich . | |
| 6,047,791 | * 4/2000 | Hoebelheinrich | 187/222 |

\* cited by examiner

*Primary Examiner*—Lanna Mai
*Assistant Examiner*—T. To
(74) *Attorney, Agent, or Firm*—Reising, Ethington, Barnes, Kisselle, Learman & McCulloch P.C.

(57) ABSTRACT

A traction weight assembly, for mounting traction weights on a utility vehicle, has a weight bar that is inserted into a tubular receptacle. The tubular receptacle is secured to the vehicle frame. A retainer pin is inserted through a retainer pin passage through the tubular receptacle and an aligned adjustment bore through the weight bar. Traction weights are mounted on a portion of the weight bar that extends to the rear of the tubular receptacle. A retainer plate is attached to the weight bar by at least one bolt that clamps the traction weights between the tubular receptacle and the retainer plate. If needed a spacer is provided between the tubular receptacle and the traction weights.

20 Claims, 3 Drawing Sheets

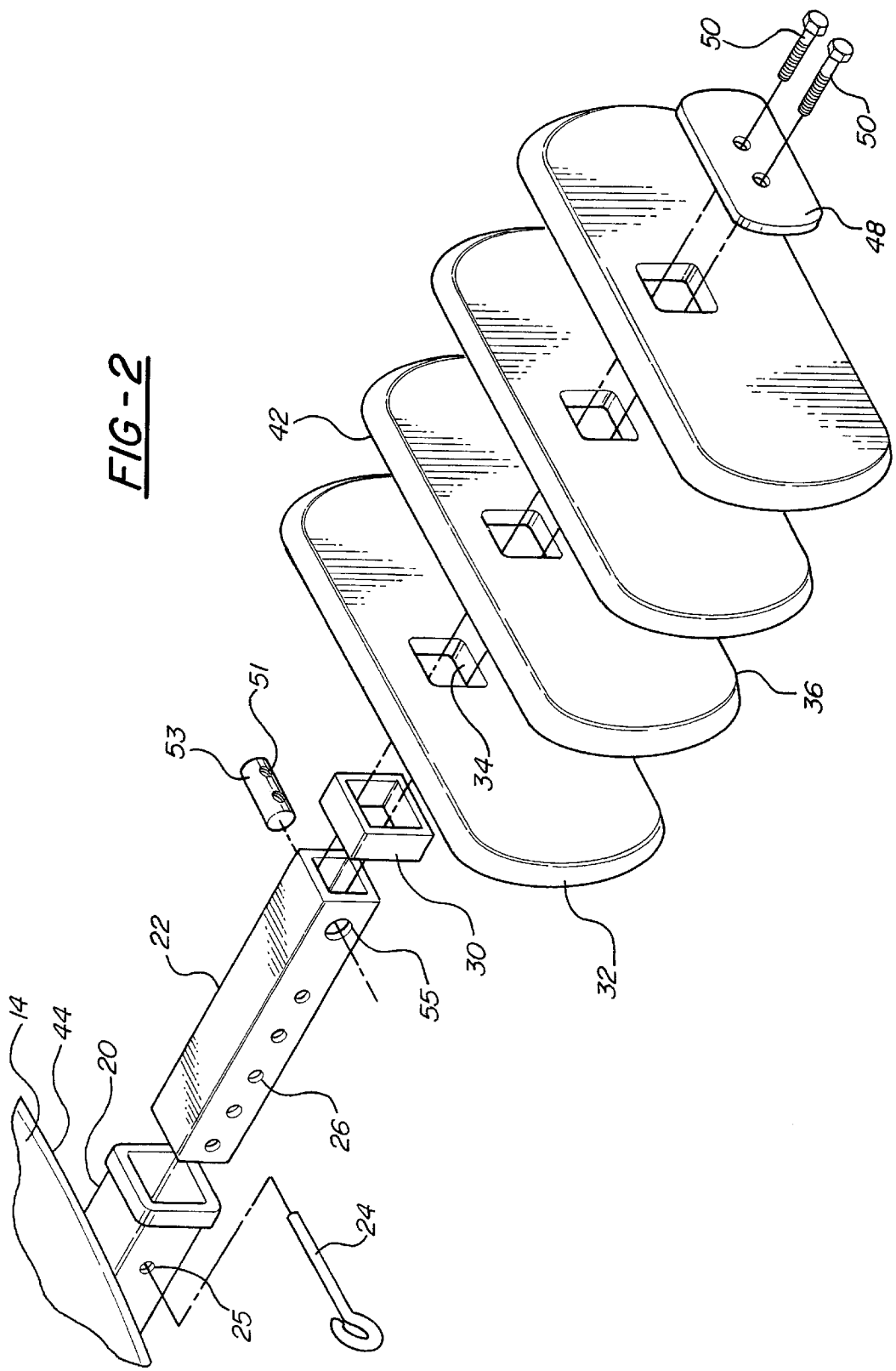

TRACTION WEIGHTS FOR LIGHT TRUCKS AND UTILITY VEHICLES

This application claims benefit of Provisional No. 60/081,104 filed Apr. 8, 1998.

TECHNICAL FIELD

This invention relates to traction weights and more particularly to traction weights that can be added to the rear of light trucks and utility vehicles or any other vehicle to improve vehicle weight distribution when they are not transporting cargo or pulling trailers. The disclosure incorporates the traction weights for light trucks and utility vehicles and methods disclosed in provisional patent application 60/081,104, filed Apr. 8, 1998, whose priority is claimed for this application.

BACKGROUND OF THE INVENTION

Light trucks and other utility vehicles are designed to haul cargo and to pull trailers. When these vehicles are empty they have a substantial portion of their total weight on their front wheels. The relatively small portion of their total weight that is carried on their rear wheels results in reduced rear wheel traction and a relatively rough ride. The reduced traction leads to increased tire wear and reduced fuel mileage. It may also lead to these vehicles having reduced stability or even becoming stalled in snow and ice conditions.

The operators of light trucks and utility vehicles have frequently added weight to cargo areas of these vehicles when operating such vehicles without cargo or a trailer. The addition of weight has been particularly common during the winter months in areas that have snowfall and ice conditions.

The addition of weight to the rear wheels of light trucks and utility vehicles helps keep them from becoming stuck in snow and ice, improves their ride characteristics, reduces tire wear, reduces stopping distance and increases fuel mileage. The addition of weights is not without problems however. The weights that are added may interfere with the transportation of other cargo. It has also been difficult to prevent added weights from moving around in the cargo area. Removal of traction weights, when they are not needed, has generally been somewhat difficult.

SUMMARY OF THE INVENTION

An object of the invention is to provide traction weights that are rigidly secured to the vehicle outside the cargo compartment. Another object of the invention is to provide traction weights that are easy to attach to and remove from a vehicle. A further object of the invention is to provide traction weights that lower the center of gravity of the vehicle. A still further object of the invention is to provide traction weights that can be easily adjusted to increase or decrease the weight to accommodate changing weather conditions. A yet still further object of the invention is to provide traction weights that are fully adjustable and adaptable to numerous vehicle makes and models. Another yet still further object of the invention is to provide traction weights that can be used in conjunction with traditional hitching systems while trailering.

The traction weight assembly is attached to a hitch commonly found on the rear of a vehicle. These hitches are attached to the rear frame of a vehicle and include a square tubular receptacle that is just below a standard rear bumper. The square tubular receptacle receives a square bar. The square bar is retained in the tubular receptacle by a retainer pin. A hitch ball of the desired size or a portion of a pintle hook hitch is mounted on the rear portion of the square bar.

The hitch receptacle receives a square weight bar, when employed to mount traction weights. This weight bar can be a solid member or a tubular member. The weight bar has a plurality of bores for a locking or retainer pin to adjust the length of the portion of the square weight bar that projects to the rear of the tubular receptacle. A spacer or plurality of spacers slide over the square weight bar and contact the rear surface of the square tubular receptacle. The spacer is optional, used primarily for adjustment and can be a rigid or resilient member. A plurality of cast iron weights with square apertures are slid onto the weight bar. A retainer plate may have a square boss that is inserted into the square aperture in the rearmost weight. A pair of bolts pass through bores through the retainer plate and screws into the rear of the weight bar or into a bar that passes through a passage through the weight bar. The bolts which can be of a locking variety, or may be used in combination with a locking washer, clamp the weights and spacers together between the retainer plate and the square tubular receptacle while loading the retainer pin. The spacer, which can be a hard rubber, a compression spring, Belleville washers or a rigid member that keeps the weights tight and thereby eliminates rattling and wear. The bolts that retain the weights can have a flat head that is recessed into the retainer plate if desired so the retainer plate provides a flat rear facing surface.

A molded plastic cover may be provided that slides over the weights and covers or encases the weights. This cover can be clamped to the weights by mechanical fasteners or it can be provided with a lid member that snaps into place.

The upper surface of the cover may be a non-skid surface that can serve as a step for climbing into a vehicle cargo compartment or for placing cargo on a rooftop cargo rack. A name or trademark may be applied to the rearward facing surface on the cover or to the retaining plate or weights if the cover is not used. The license plate can also be attached to the rear facing surface of the cover or to the weights if desired.

The number of traction weights can be changed by removing the plastic cover, removing the retainer plate, and removing the locking pin from the tubular receptacle and the square weight bar. The square weight bar is then moved rearwardly to a position in which it can receive and support additional traction weights or it is moved forward to a position in which the number of weights that can be received and supported is decreased. After the length of the weight bar portion extending to the rear of the tubular receptacle is adjusted, the locking pin is reinserted to secure the weight bar in place. The desired number of weights are then mounted on the weight bar, and the retainer plate is secured to the weight bar and tightened. The plastic cover is then put back in place and secured.

A longer square bar may be provided that extends from the square tubular receptacle on the vehicle through the spacers and weights and continues a selected distance rearward of the vehicle. A square tubular retainer slides over the longer square bar in a telescoping manner, compressing the weights and spacers between the square tubular receptacle and the square tubular retainer. A retaining pin passes through holes in both the longer square bar and the square tubular retainer, locking the weights in place. The resilient spacer becomes compressed keeping the weights tight and thereby eliminating rattle and wear. A hitch ball of the desired size or a portion of a pintle hook hitch is mounted on the rear portion of the square tubular retainer. Thus, allowing traction weight use in conjunction with traditional hitching systems while trailering.

BRIEF DESCRIPTION OF THE DRAWINGS

The foregoing and other objects, features and advantages of the present invention will become apparent in light of the following detailed description of an exemplary embodiment thereof, as illustrated in the accompanying drawings:

FIG. 2 is an expanded perspective view of the traction weight assembly;

DESCRIPTION OF THE PREFERRED EMBODIMENTS

Figure 1:
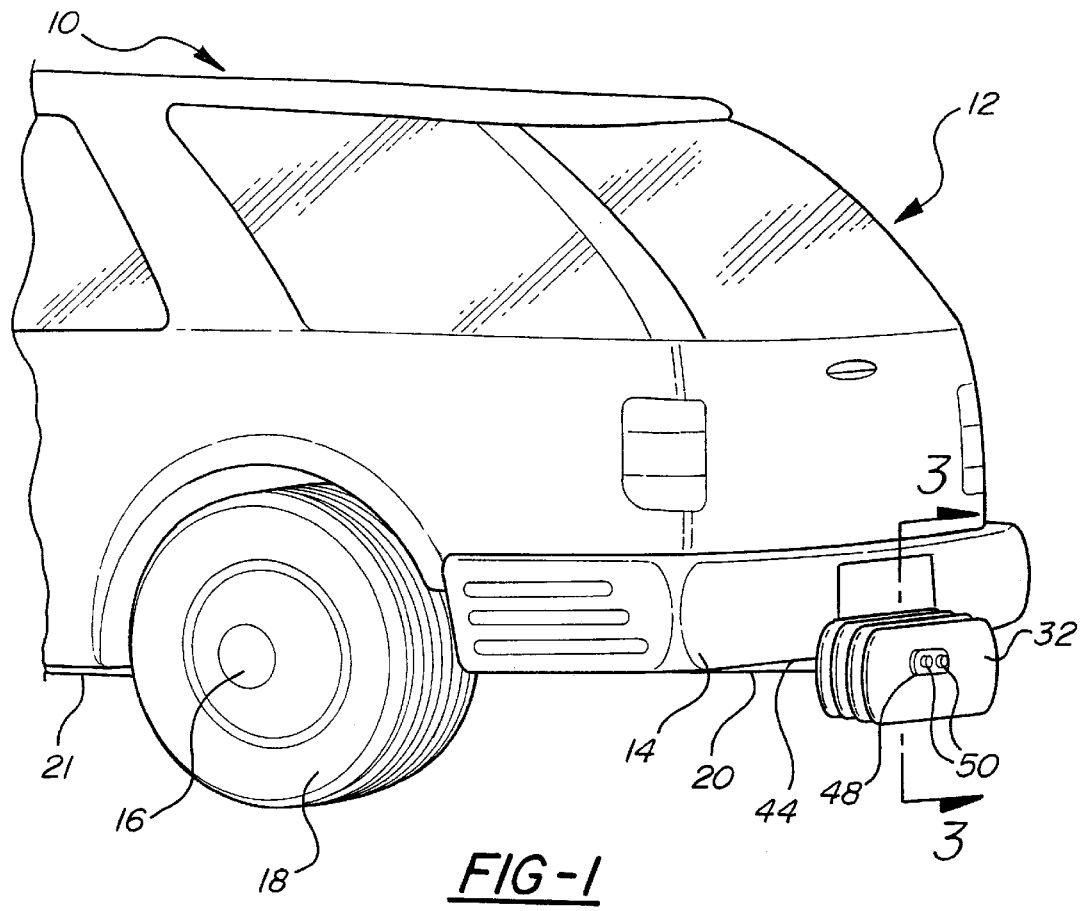
FIG. 1 is a rear elevational view of a vehicle with a traction weight attached.

The utility vehicle 10, as shown in FIG. 1 has a cargo compartment 12, a rear bumper 14, a rear axle 16 and driven rear wheels 18. A hitch square tubular receptacle 20 is secured to the frame 21 of the vehicle 10, in a well known manner, and is positioned just below the bumper 14 and in the center of the vehicle.

Figure 3:
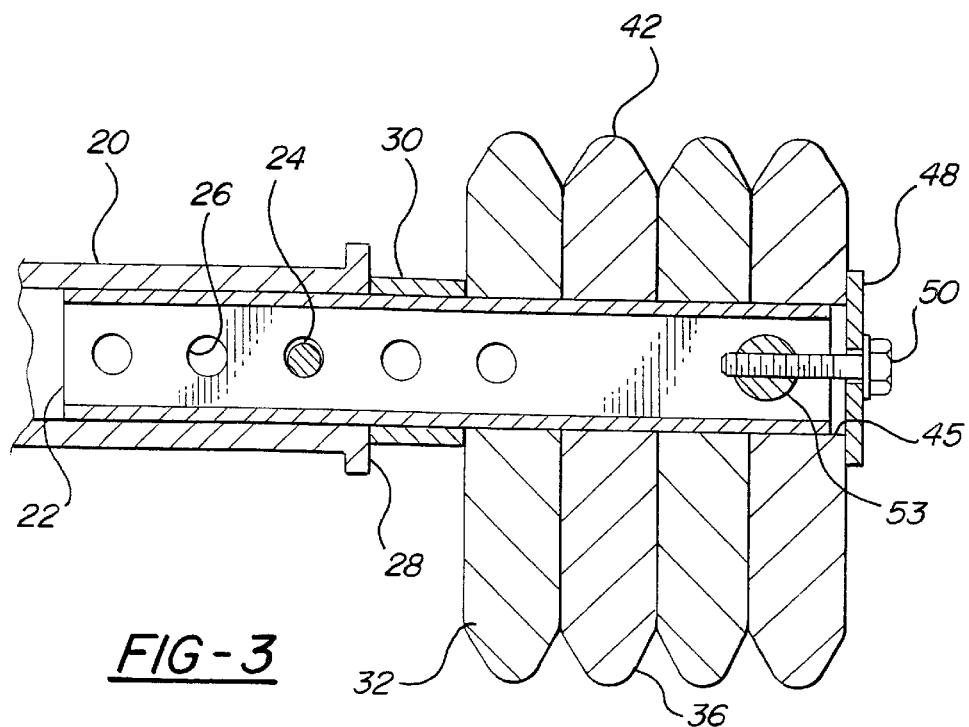
FIG. 3 is a sectional view of the traction weight assembly taken along line 3—3 in FIG. 1.
Figure 4:
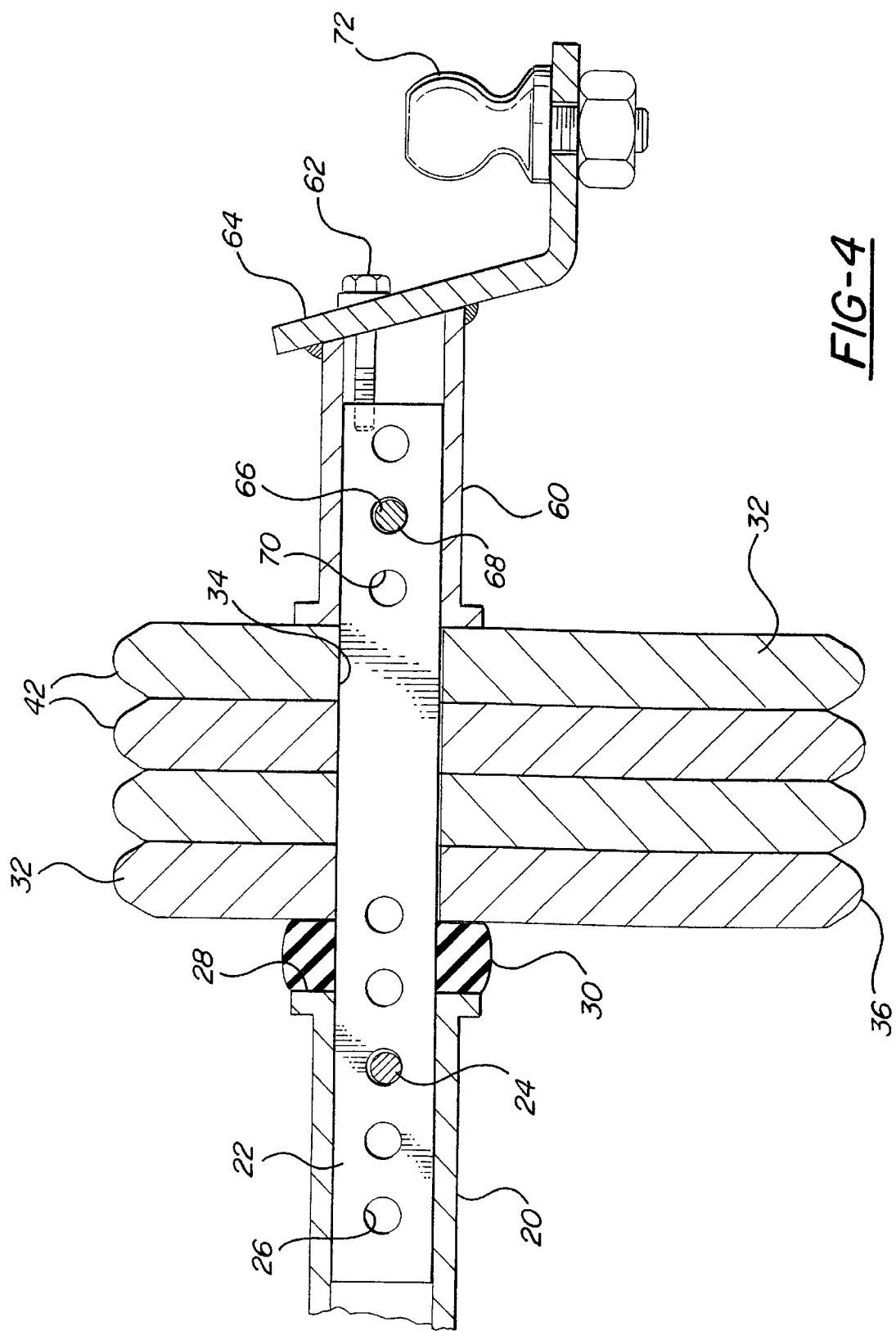
FIG. 4 is a sectional view similar to FIG. 3 with a hitch ball added.

A square weight bar 22 is telescopically received in the tubular receptacle 20 and is held in place by a locking or retainer pin 24 that passes through a retainer pin passage 25. A plurality of bores 26 through the weight bar 22 can receive the retainer pin 24 and vary the length of the weight bar extending to the rear of the rear surface 28 of the tubular receptacle 20. The weight bar with a square cross section can be a tubular member as shown in FIG. 3 or it can be a solid member as shown in FIG. 4.

A spacer 30 slides over the weight bar 22 and contacts the rear surface 28 of the tubular receptacle 20. The spacer 30 can be a rigid member or it can be a resilient member of hard rubber, a compression spring, Belleville washers or some similar device. The spacer 30 is made with an axial length that holds the forward weight 32 out of contact with the bumper 14. If a spacer 30 is not required to provide clearance between the forward weight 32 and the bumper 14, the spacer can be eliminated.

Traction weights 32 are provided with square apertures 34 that telescopically receive the weight bar 22 and slide forward into contact with the spacer 30 or the surface 28 of the receptacle 20. As shown in FIGS. 1 and 2, the traction weights 32 have a length that is about one-fourth the width of the vehicle. The weights 32 can extend from one side of the vehicle to the other or they can be shorter than shown. The bottom surface 36 of each traction weight is at about the same vertical height as the bottom of the axle housings and above the bottom of the differential housing of the rear axle 16. The top surface 42 of each traction weight 32 is above the bottom 44 of the rear bumper 14. Each of the traction weights 32 weighs between 35 and 65 pounds. Cast iron is a suitable material for the weights 32 but they can also be steel or other suitable material. Each of the weights can also be made from two or more materials.

There are four traction weights 32 on the square weight bar 22 as shown in the drawing. The number of traction weights 32 that are actually used can vary to meet the requirements for improved traction. The rearmost traction weight 32 extends up to about one-half the thickness of each weight to the rear of the weight bar 22 as shown in FIG. 3. This provides space 45 for the weight retainer bolts 50 to compress the traction weights 32 and the spacer 30. The square apertures 34 cooperate with the square weight bar 22 to keep the traction weights 32 from moving about the axis of the receptacle 20. Tightening the weight retainer bolts 50 to clamp the traction weights 32 between the retainer plate 48 and the rear surface 28 on the tubular receptacle 20 keeps the traction weights 32 from rattling and moving around.

The heads of the bolts 50 can be recessed into the retainer plate 48 so that they do not protrude to the rear of the retainer plate if desired. The bolts 50 screw into threaded bores 51 in a pin 53 as shown in the drawing. The pin 53 is inserted into a passage 55 through the tubular weight bar 22 and is welded in place. If the bar 22 is a solid member, the threaded bores 51 would be in the bar.

The traction weights 32 and the retainer plate 48 can be coated with a material that resists oxidation or they could be chrome plated. The traction weight 32 can also be covered by a molded plastic cover. The plastic cover 52 can be a plurality of covers that encase each traction weight 32 and the retainer plate 48. The plastic cover may also cover only a portion of the traction weights 32. The plastic cover could also be two pieces including a front half with a front wall and a skirt and a rear half with a rear wall and a skirt that is telescopically received within the skirt of the front half. The upper surfaces 42 of the weights 32 or the molded plastic cover are preferably non-skid surfaces. Non-skid surfaces will allow the traction weights 32 to also serve as a step for entering the cargo compartment 12 or for placing cargo on a rooftop carrier.

The use of a resilient spacer 30, as described above, will provide some cushioning and reduce or eliminate damage that could result from the weights 32 being struck. The tension exerted on the weight bar 22 by the bolts 50 will tend to lock the retainer pin 24 in place. However, a cotter key or other securing device is also used to secure the retainer pin 24.

The longer square bar 22, shown in FIG. 4, extends from inside the square tubular receptacle 20 on the vehicle 10 through the spacer 30 and the weights 32 and continues a selected distance rearward of the weights. A square tubular retainer 60 is telescopically received on the rear portion of the weight bar 22. A bolt 62 passes through a plate 64 welded to the retainer 60 and screws into a threaded bore in the bar 22. The bolt 62 is tightened to compress the weights 32 and the spacer 30 until a retaining pin 66 can be inserted through aligned holes 68 and 70 through the tubular retainer 60 and the square bar 22. After the retaining pin 66 is inserted, the bolt 62 can be removed if desired. The resilient spacer 30 keeps the weights 32 tight thereby eliminating wear. A ball 72 for a ball hitch is secured to the plate 64. The ball 72 is used in combination with the weights 32 when pulling a lightweight trailer.

Preferred embodiments of the invention have been described in detail but are examples only and the invention is not restricted thereto. It will be easily understood by those skilled in the art that modifications and variations can easily be made within the scope of this invention.

What is claimed is:

1. A utility vehicle tractor weight assembly comprising:
   a vehicle frame;
   a hitch assembly including a tubular receptacle attached to the vehicle frame and having rearwardly facing surface and a transverse retainer pin passage through the tubular receptacle spaced from the rearwardly facing surface;

a weight bar telescopically received in the tubular receptacle and having a plurality of transverse bores;

a retainer pin passing through the transverse retainer pin passage and through one of the plurality of transverse bores to hold the weight bar in the tubular receptacle with a portion of the weight bar extending out of the tubular receptacle a predetermined distance from the rearwardly facing surface;

at least one traction weight with an aperture that telescopically receives the weight bar; and a mechanical retainer assemble including a retainer plate and a bolt that passes through a bore in the retainer plate, screws into a threaded fore and aft bore in the weight bar and clamps the at least one traction weight between the retainer plate and the rearwardly facing surface on the tubular receptacle.

2. A utility vehicle traction weight assembly as set forth in claim 1 including a spacer telescopically mounted on the weight bar between the rearwardly facing surface and the at least one traction weight.

3. A utility vehicle traction weight assembly as set forth in claim 2 wherein the spacer is a resilient member.

4. A utility vehicle traction weight assembly as set forth in claim 2 including a plurality of said traction weights mounted on the weight bar.

5. A utility vehicle traction weight assembly as set forth in claim 1 including a plurality of said traction weights telescopically received the weight bar.

6. A utility vehicle traction weight assembly as set forth in claim 4 including a traction weight cover that at least partially encases the plurality of traction weights.

7. A utility vehicle traction weight assembly as set forth in claim 1 wherein the weight bar has a non-circular outer surface that cooperates with the tubular receptacle and the aperture through the at least one traction weight to limit rotation of the at least one traction weight relative to the tubular receptacle.

8. A utility vehicle traction weight assembly as set forth in claim 1 wherein the weight bar is an elongated bar with a square cross section and the aperture through the at least one traction weight is square.

9. A utility vehicle traction weight assembly as set forth in claim 1 wherein the mechanical retainer assembly attached to the weight bar includes a trailer hitch.

10. A utility vehicle traction weight assembly as set forth in claim 1 wherein the mechanical retainer assembly includes a tubular retainer that is telescopically received on the rear portion of the weight bar, a second retainer pin that passes through the tubular retainer and the weight bar, and a trailer hitch ball secured to the tubular receiver.

11. A utility vehicle traction weight assembly comprising:

a vehicle frame;

a hitch assembly including a square tubular receptacle attached to the vehicle frame and having a rearwardly facing surface and a retainer pin passage spaced from the rearwardly facing surface;

a square weight bar telescopically received in the square tubular receptacle and having a plurality of adjustment bores;

a retainer pin passing through the retainer pin passage and through one of the plurality of adjustment bores to hold the square weight bar in the square tubular receptacle with a portion of the square weight bar extending out of the square tubular receptacle a predetermined distance from the rearwardly facing surface;

a spacer telescopically received on the square weight bar and in contact with the rearwardly facing surface;

a plurality of traction weight each of which has a square aperture that telescopically receives the square weight bar; and a mechanical retainer assembly including a retainer plate and at least one mechanical fastener that secures the retainer plate to the square weight bar and clamps the plurality of traction weights and the spacer between the retainer plate and the square tubular receptacle.

12. A utility vehicle traction weight assembly as set forth in claim 11 wherein the retainer plate of the mechanical retainer assembly is secured to said square weight bar by at least two threaded fasteners.

13. A utility vehicle traction weight assembly as set forth in claim 11 including a traction weight cover that at least partially encases the plurality of traction weights.

14. A utility vehicle traction weight assembly as set forth in claim 11 wherein said spacer has an axial length that hold the plurality of traction weights from contact with the utility vehicle.

15. A utility vehicle traction weight assembly as set forth in claim 11 wherein said spacer is resilient.

16. A utility vehicle traction weight assembly as set forth in claim 11 wherein said square weight bar is tubular and has a holder pin passing through a transverse bore through said square weight bar and said holder pin has at least one threaded bore that receives said at least one mechanical fastener for securing the retainer plate to the square weight bar.

17. A method of adding ballast to a utility vehicle to modify weight distribution and improve traction comprising:

a) mounting a hitch assembly, with a square tubular receptacle and a retainer pin passage through the square tubular receptacle on the vehicle;

b) inserting a weight bar into the square tubular receptacle with a bore through the weight bar in alignment with the retainer pin passage and a predetermined portion of the weight bar projecting out of the square tube;

c) inserting a retainer pin through the retainer pin passage and the bore through the weight bar thereby fixing the position of the weight bar relative to square tubular receptacle;

d) mounting a plurality of traction weights on the weight bar; and e) securing the plurality of traction weights on the weight bar between the square tubular receptacle and a retainer plate secured to the weight bar.

18. A method of adding ballast to a utility vehicle as set forth in claim 17 including:

placing a spacer on the weight bar between the square tubular receptacle and the plurality of traction weights.

19. A method of adding ballast to a utility vehicle as set forth in claim 17 including:

mounting a traction weight cover on the weight bar that at least partially encases the plurality of traction weights.

20. A method of adding ballast to a utility vehicle as set forth in claim 17 including:

clamping the plurality of traction weights between the square tubular receptacle and the retainer plate.

* * * * *